United States Patent [19]

Shallenberger et al.

[11] Patent Number: 4,699,758
[45] Date of Patent: Oct. 13, 1987

[54] REUSABLE LOCKING TUBE IN A RECONSTITUTABLE FUEL ASSEMBLY

[75] Inventors: John M. Shallenberger, Fox Chapel; Stephen J. Ferlan, Wilkins Township, Alleghany County, both of Pa.

[73] Assignee: Westinghouse Electric Corp., Pittsburgh, Pa.

[21] Appl. No.: 719,108

[22] Filed: Apr. 2, 1985

[51] Int. Cl.⁴ .............................................. G21C 3/32
[52] U.S. Cl. .................................. 376/446; 376/353; 376/449; 285/86; 285/921
[58] Field of Search ............... 376/446, 449, 353, 364; 285/371, 398, 921, 86; 403/101, 357; 29/400 N, 523, 428

[56] References Cited

U.S. PATENT DOCUMENTS

| 922,805 | 5/1909 | Nelson et al. | 285/921 |
| 3,217,400 | 11/1965 | Illesy et al. | 285/921 |
| 3,784,235 | 1/1974 | Kessler et al. | 285/921 |
| 3,990,727 | 11/1976 | Gallagher | 285/921 |
| 4,303,476 | 12/1981 | Lecfercq | 376/446 |
| 4,433,815 | 2/1984 | D'Agrolo | 285/921 |
| 4,451,069 | 5/1984 | Melone | 285/86 |
| 4,535,523 | 8/1985 | Lecfercq | 376/446 |
| 4,617,171 | 10/1986 | Feutrel | 376/446 |

FOREIGN PATENT DOCUMENTS

| 0036821 | 9/1981 | European Pat. Off. | 376/446 |
| 0041014 | 12/1981 | European Pat. Off. | |
| 0076748 | 4/1983 | European Pat. Off. | 376/446 |
| 0098774 | 1/1984 | European Pat. Off. | |
| 0140588 | 5/1985 | European Pat. Off. | 376/446 |
| 0182149 | 5/1986 | European Pat. Off. | |
| 2493024 | 4/1982 | France | 376/446 |
| 2529704 | 1/1984 | France | 376/446 |
| 2129189 | 5/1984 | United Kingdom | 376/446 |

Primary Examiner—Deborah L. Kyle
Assistant Examiner—Daniel Wasil

[57] ABSTRACT

In a reconstitutable fuel assembly, a top nozzle attaching structure, which has an outer socket formed by a circumferential groove defined in the top nozzle adapter plate passageway wall and an inner socket formed by a circumferential bulge defined in the guide thimble upper end portion being capable of seating within the circumferential groove, incorporates an improved reusable tube disposable at a locking position for releasably locking the inner socket in locking engagement within the outer socket when the circumferential bulge is seated within the circumferential groove. The reusable locking tube includes an elongated hollow metal tubular body and at least a pair of small dimples preformed on the tubular body exterior prior to initial insertion of the locking tube to its locking position. The dimples are so preformed and configured to have a generally pyramidal shape such that the metal forming the dimples substantially resists yielding and dimensional change regardless of the number of insertions and withdrawals of the tubular body into and from the locking position. Also, the dimples are located along the exterior of the tubular body and have outer tips diametrically displaced from one another across the tubular body such that when the body is inserted to the locking position, the dimples extend into the circumferential bulge defined in the guide thimble upper end portion and provide a positive interference fit with the guide thimble upper end portion above the circumferential bulge therein and with the upper portion of the adapter plate passageway wall which prevents inadvertent withdrawal of the tubular body from the locking position.

8 Claims, 7 Drawing Figures

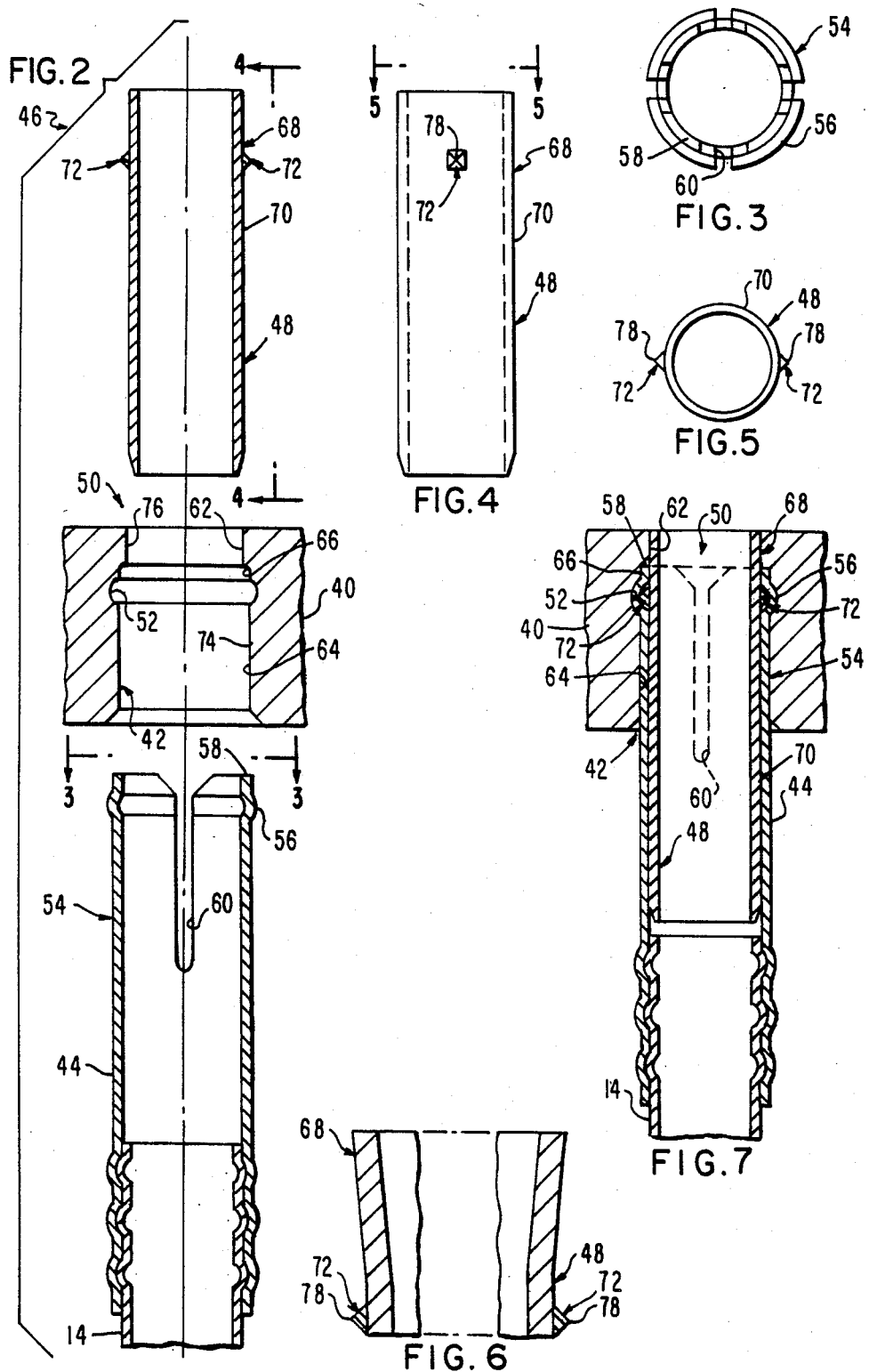

REUSABLE LOCKING TUBE IN A RECONSTITUTABLE FUEL ASSEMBLY

CROSS REFERENCE TO RELATED APPLICATIONS

Reference is hereby made to the following copending applications dealing with related subject matter and assigned to the assignee of the present invention:

1. "Nuclear Reactor Fuel Assembly With A Removable Top Nozzle" by John M. Shallenberger et al, assigned U.S. Ser. No. 644,758 and filed Aug. 27, 1984, now U.S. Pat. No. 4,631,168.

2. "Guide Thimble Captured Locking Tube In A Reconstitutable Fuel Assembly" by Gary E. Paul, assigned U.S. Ser. No. 717,991 and filed Mar. 29, 1985.

BACKGROUND OF THE INVENTION

1. Field of the Invention

The present invention relates generally to fuel assemblies for nuclear reactors and, more particularly, is concerned with improved reusable locking tubes for releasably locking the top nozzle on the upper ends of the control rod guide thimbles.

2. Description of the Prior Art

In most nuclear reactors, the reactor core is comprised of a large number of elongated fuel assemblies. Conventional designs of these fuel assemblies include a plurality of fuel rods and control rod guide thimbles held in an organized array of grids spaced along the fuel assembly length and attached to the control rod guide thimbles. Top and bottom nozzles on opposite ends of the fuel assembly are secured to the guide thimbles which extend slightly above and below the ends of the fuel rods. At the top end of the fuel assembly, the guide thimbles are attached in passageways provided in the adapter plate of the top nozzle. The guide thimbles may each include an upper sleeve for attachment to the top nozzle.

During operation of such fuel assembly in a nuclear reactor, a few of the fuel rods may occasionally develop cracks along their lengths resulting primarily from internal stresses. Thus establishing the possibility that fission products having radioactive characteristics may seep or otherwise pass into the primary coolant of the reactor. Such products may also be released into a flooded reactor cavity during refueling operations or into the coolant circulated through pools where the spent fuel assemblies are stored. Since the fuel rods are part of the integral assembly of guide thimblies welded to the top and bottom nozzles, it is difficult to detect and remove the failed rods.

Until recently, to gain access to these rods it was necessary to remove the affected assembly from the nuclear reactor core and then break the welds which secure the nozzles to the guide thimbles. In so doing, the destructive action often renders the fuel assembly unfit for further use in the reactor because of the damage done to both the guide thimbles and the nozzle which prohibits rewelding.

In view of the high costs associated with replacing fuel assemblies, considerable interest has arisen in reconstitutable fuel assemblies in order to minimize operating and maintenance expenses. The general approach to making a fuel assembly reconstitutable is to provide it with a removable top nozzle. One reconstitutable fuel assembly construction, devised recently, is illustrated and described in the first U.S. patent application cross-referenced above. It incorporates an attaching structure for removably mounting the top nozzle on the upper ends of the control rod guide thimbles.

The attaching structure includes a plurality of outer sockets defined in an adapter plate of the top nozzle, a plurality of inner sockets with each formed on the upper end of one of the guide thimbles, and a plurality of removable locking tubes inserted in the inner sockets to maintain them in locking engagement with the outer sockets. Each other socket is in the form of a passageway through the adapter plate which has an annular groove. Each inner socket is in the form of a hollow upper end portion of the guide thimble having an annular bulge which seats in the annular groove when the guide thimble end portion is inserted in the adapter plate passageway. A plurality of elongated axial slots are provided in the guide thimble upper end portion to permit inward elastic collapse of the slotted portion so as to allow the larger bulge diameter to be inserted within and removed from the annular circumferential groove in the passageway of the adapter plate. In such manner, the inner socket of the guide thimble is inserted into and withdrawn from locking engagement with the outer socket.

The locking tube is inserted from above the top nozzle into a locking position in the hollow upper end portion of the guide thimble forming the inner socket. When inserted in its locking position, the locking tube retains the bulge of the inner socket in its expanded locking engagement with the annular groove and prevents the inner socket from being moved to a compressed releasing position in which it could be withdrawn from the outer socket. In such manner, the locking tubes maintain the inner sockets in locking engagement with the outer sockets, and thereby the attachment of the top nozzle on the upper ends of the guide thimbles.

Furthermore, to prevent inadvertent escape due to vibration forces and the like, heretofore the locking tubes have been secured in their locking positions. After insertion of the locking tubes into their locking positions within the inner sockets of the hollow upper end portions of the guide thimbles, a pair of bulges are formed in the upper portion of each locking tube. These bulges fit into the circumferential bulge in the upper end portion of the guide thimble and provide an interference fit therewith.

Another arrangement for securing a locking tube in its locking position within the upper end of the guide thimble and the passageway of the adapter plate is described and illustrated in French Pat. No. 2,529,704, wherein a number of crimps are formed between the locking ring or tube upper portion and the wall of the bore through the endpiece of adapter plate. Each crimp is composed of a "flat spot" on the wall of the locking ring or tube and an annular groove located facing and interacting with the flat spot. The annular groove is formed in the wall of the bore through the endpiece or adapter plate. The crimps are located above another larger concave annular groove in the adapter plate passageway which receives the circumferentially enlarged, slotted upper end portion of the guide thimble. It is believed that the crimps are formed by plastic deformation of the locking tube wall after the locking tube has been inserted into its locking position within the endpiece or adapter plate.

Then, when reconstitution of the fuel assembly is undertaken, these locking tubes must first be withdrawn by exerting axial force to overcome the interference fit. This partially collapses the locking tube bulges and "flat spots", having been earlier formed by plastic deformation, as the locking tubes are removed from the guide thimble upper end portions and the adapter plate passageways. After the failed fuel rods have been removed and replaced and following remounting of the top nozzle, the common practice is to discard the old locking tubes with the partially collapsed bulges and "flat spots" and install a full complement of new locking tubes on the guide thimble upper ends and secure them by plastic deformation.

This practice has a number of disadvantages. First, a large inventory of locking tubes must be maintained. Second, provision must be made for disposal of the discarded irradiated locking tubes. Third, after each locking tube is inserted, a deforming operation must be carried out remotely to produce the bulges in each tube. And, fourth, an inspection of bulges must be carried out remotely to ascertain whether the bulges were made to the correct dimensions. Consequently, notwithstanding the overall acceptability of the use of the above-described attaching structure in reconstitutable fuel assemblies, these recently recognized disadvantages have created a need for further improvement of the reconstitution operation so as to enhance commercial acceptance thereof.

SUMMARY OF THE INVENTION

The present invention provides a reconstitutable fuel assembly with improved reusable locking tubes which are designed to satisfy the aforementioned needs by eliminating the disadvantages associated with the prior locking tubes. The reusable locking tubes of the present invention improve the reconstitution operation in several ways. First, their use reduces the time required to reconstitute the fuel assembly by eliminating the locking tube deforming operation after remounting the top nozzle and by eliminating the need to inspect the local deformations or bulges. Second, by reusing the locking tubes, provisions are not necessary for disposal of replaced, irradiated locking tubes. Third, the requirement to have the following reconstitution hardware is eliminated; the locking tube deforming tool, the bulge inspection apparatus, the inventory of replacement locking tubes, and the canisters and associated tooling for used locking tubes. Fourth, during manufacture, assembly time can be reduced due to the elimination of locking tube deforming after insertion by the deletion of the bulge dimension inspection. Fifth, a lower inventory of locking tubes at the manufacturing site is also possible since top nozzles which occasionally must be removed after mounting can now utilize the originally inserted locking tubes. To summarize, by the simple design change in the locking tube concept contemplated by the present invention, the reconstitutable fuel assembly manufacturing process is simplified and easier, more trouble-free removal and remounting of the top nozzle during reconstitution is achieved which result in an overall more efficient and reliable reconstitution operation without impacting the highly desirable basic design and integrity of the top nozzle/guide thimble attaching structure described and illustrated in the first patent application cross-referenced above. The reusable locking tubes of the present invention can also be backfitted on existing reconstitutable fuel assemblies.

Accordingly, the present invention sets forth in a reconstitutable fuel assembly including a top nozzle with an adapter plate having an interior wall forming at least one passageway, at least one guide thimble with an upper end portion, and an attaching structure having an outer socket formed by a circumferential groove defined in the adapter plate passageway wall and opening into the passageway and an inner socket formed by a circumferential bulge and at least one longitudinal slot defined in the upper end portion of the guide thimble, the circumferential bulge being capable of seating within the circumferential groove, an improved reusable tube for releasably locking the inner socket of the guide thimble upper end portion in locking engagement within the outer socket of the adapter plate passageway when the circumferential bulge is seated within the circumferential groove. The reusable tube comprises: (a) an elongated hollow tubular body capable of insertion within the adapter plate passageway and guide thimble upper end portion to a locking position therein such that the circumferential bulge of the inner socket is maintained seated in locking engagement with the circumferential groove of the outer socket; and (b) at least a pair of small dimples preformed on the exterior of the tubular body prior to insertion of the body to the locking position. The dimples are preformed and configured such that the material forming the dimples substantially resists yielding and dimensional change regardless of the number of insertions and withdrawals of the tubular body into and from the locking position. Also, the dimples are located along the exterior of the tubular body and have outer tips diametrically displaced from one another across the tubular body such that when the tubular body is inserted to the locking position the dimples extend into the circumferential bulge defined in the guide thimble upper end portion and provide a positive interference fit with the guide thimble upper end portion above the circumferential bulge therein and with the upper portion of the adapter plate passageway wall which prevents inadvertent withdrawal of the tubular body from the locking position.

More particularly, the tubular body has a lower portion and an upper portion with the lower body portion being substantially greater in length than the upper body portion. The upper body portion is outwardly flared progressively from its connection to the lower body portion to an upper edge of the upper body portion so as to provide a tight fit with an upper portion of the adapter plate passageway wall when the tubular body is inserted to the locking position. Further, the pair of dimples are preformed along the exterior of the tubular body at the region of connection of the upper body portion to the lower body portion. Each of the dimples has a generally pyramidal-shaped configuration.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 2 is a sectioned, exploded view of the components of the attaching structure associated with the top nozzle and the guide thimbles of the reconstitutable fuel assembly with one of the components of the attaching structure being the improved reusable locking tube of the present invention.

FIG. 3 is a top plan view, as seen along line 3—3 of FIG. 2, looking down on the top of the upper end of the control rod guide thimble.

FIG. 4 is a side elevational view of the improved reusable locking tube by itself, showing one preformed dimple on a side of the tube.

FIG. 5 is a top plan view, as seen along line 5—5 of FIG. 4, looking down on the top of the improved reusable locking tube, showing a pair of preformed dimples on opposite exterior sides of the tube.

FIG. 6 is an enlarged fragmentary view of the upper end of the improved reusable locking tube of FIG. 2, showing a slightly outwardly tapered or flared upper peripehral edge portion thereof.

FIG. 7 is a sectional view of the components of the attaching structure of FIG. 2, which includes the improved reusable locking tube of the present invention, being assembled together.

DETAILED DESCRIPTION OF THE INVENTION

Figure 1:
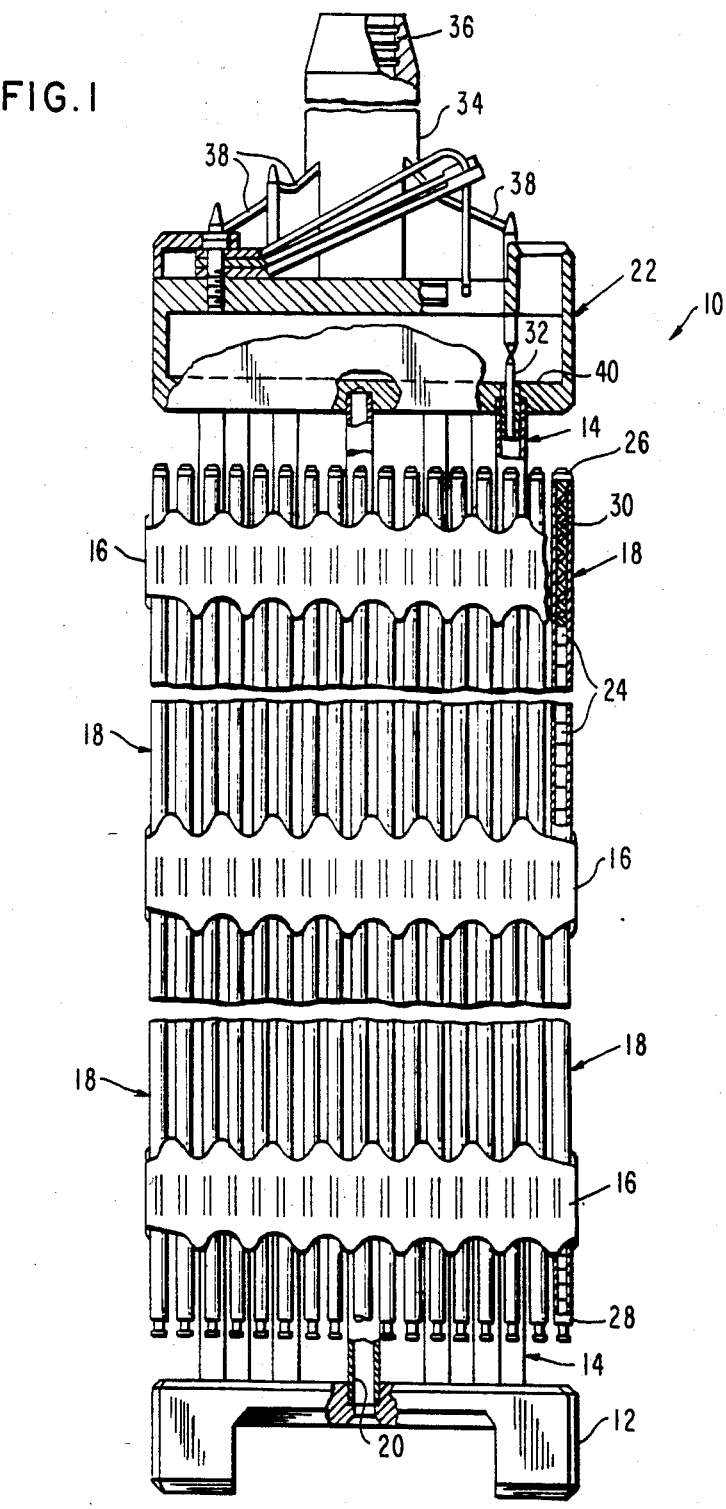
FIG. 1 is a side elevational view, with parts partially sectioned and broken away for purposes of clarity, of a reconstitutable fuel assembly employing the improved reusable locking tubes of the present invention.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a reconstitutable nuclear reactor fuel assembly, represented in vertically foreshortened form and being generally designated by the numeral 10. Basically, the fuel assembly 10 includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 removably attached to the upper ends of the guide thimbles 14, in a manner fully described below, to form an integral assembly capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26,28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the nuclear reactor. A liquid moderator/coolant such as water, or water containing boron, is pumped upwardly through the fuel assemblies of the core in order to extract heat generated therein for the production of useful work.

To control the fission process, a number of control rods 32 are reciprocally movable in the guide thimbles 14 located at predetermined positions in the fuel assembly 10. Specifically, the top nozzle 22 includes a rod cluster control mechanism 34 having an internally threaded cylindrical member 36 with a plurality of radially extending flukes or arms 38. Each arm 38 is interconnected to a control rod 32 such that the control mechanism 34 is operable to move the control rods 32 vertically in the guide thimbles 14 to thereby control the fission process in the fuel assembly 10, all in a well-known manner.

As illustrated in FIG. 1, the top nozzle 22 has a lower adapter plate 40 with a plurality of control rod passageways 42 (only one being shown) formed through the adapter plate. The control rod guide thimbles 14 have their uppermost end portions 44 coaxially positioned within the passageways 42 in the adapter plate 40. For gaining access to the fuel rods 18, the adapter plate 40 of the top nozzle 22 is removable connected to the upper end portions 44 of the guide thimbles 14 by an attaching structure, generally designated 46. The attaching structure 46, best seen in FIGS. 2 and 7, includes the improved reusable locking tube 48 of the present invention. Except for certain important improved features of the locking tube 48 which renders it reusable and will be discussed later, the attaching structure 46 contains features generally similar to those depicted in FIGS. 9 and 14 of the first patent application cross-referenced above. The prior features of the attaching structure 46 will be described herein to the extend necessary to facilitate an understanding of the improved features incorporated in each of its locking tubes 48 by the present invention.

Top Nozzle Attaching Structure

As best seen in FIGS. 2 and 7, the top nozzle attaching structure 46 of the reconstitutable fuel assembly 10 includes a plurality of outer sockets 50 (only one being shown) defined in the top nozzle adapter plate 40 by the plurality of passageways 42 (also only one being shown) which each contains an annular circumferential groove 52 (only one being shown), a plurality of inner sockets 54 (only one being shown) defined on the upper end portions 44 of the guide thimbles 14, and a plurality of improved removable locking tubes 48 (only one being shown) inserted in the inner sockets 54 to maintain them in locking engagement with the outer sockets 50.

Each inner socket 54 is defined by an annular circumferential bulge 56 on the hollow upper end portion 44 of one guide thimble 14 only a short distance below its upper edge 58. A plurality of elongated axial slots 60 are formed in the upper end portion 44 of each guide thimble 14 to permit inward elastic collapse of the slotted end portion to a compressed position so as to allow the circumferential bulge 56 thereon to be inserted within and removed from the annular groove 52 via the adapter plate passageway 42. The annular bulge seats in the annular groove 52 when the guide thimble end portion 44 is inserted in the adapter plate passageway 42 and has assumed an expanded position. In such manner, the inner socket 54 of each guide thimble 14 is inserted into and withdrawn from locking engagement with one of the outer sockets 50 of the adapter plate 40.

More particularly, the axially extending passageway 42 in the adapter plate 40 which defines the outer socket 50 is composed of an upper bore 62 and a lower bore 64. The lower bore 64 is of considerably greater axial length than the upper bore 62 and contains the annular groove 52 which is spaced a short distance below a ledge 66 formed at the intersection of the upper and lower bores 62,64. The lower bore 64 has a diameter which is greater than that of the upper bore 62; therefore, the ledge 66 faces in a downward direction. The primary purpose of the ledge 66 is to serve as a stop or an alignment guide for proper axial positioning of the upper end portion 44 in the passageway 42 when the inner socket 54 is inserted into the outer socket 50. As seen in FIG. 7, the upper edge 58 abuts the ledge 66.

Finally, each improved locking tube 48, as provided heretofore, is inserted from above the top nozzle 22 into its respective locking position in the hollow upper end portion 44 of one guide thimble 14 forming one inner socket 54. When the locking tube 48 is inserted in its locking position, as seen in FIG. 7, it retains the bulge 56 of the inner socket 54 in the latter's expanded locking engagement with the annular groove 54 and prevents the inner socket 54 from being moved to its compressed releasing position in which it could be withdrawn from the outer socket 50. In such manner, each locking tube 48 maintains its respective one inner socket 54 in locking engagement with the outer socket 50, and thereby the attachment of the top nozzle 22 on the upper end portion 44 of each guide thimble 14.

Additionally, heretofore, securing means in the form of a pair of bulges (not shown) were formed by plastic deformation into the upper portion of the locking tube 48 after its insertion into the passageway 42. The bulges fit into the circumferential bulge 56 in the guide thimble upper end portion 44 or inner socket 52. Also, as seen in FIG. 6, the securing means further included a slightly outwardly flared (for instance 1-2 degrees) upper peripheral marginal edge portion 68 of the locking tube 48. While the remaining lower portion of the locking tube 48 has an outside diameter smaller than the inside diameters of the adapter plate passageway bores 62,64 and the guide thimble upper end portion 44, the outer diameter of the upper marginal edge portion 68 of the locking tube is slightly larger than the diameter of the upper bore 62.

Thus, when the locking tube 48 is inserted into the passageway 42, a tight frictional fit is formed with the adapter plate 40 within the upper bore 62. Although the flared upper marginal edge portion 68 does not provide a positive securement, the bulges do. Thus, any vibrational forces or the like, were unlikely to be able to dislodge the locking tube 48 from its locking position. However, whenever the locking tube 48 is removed from the upper end portion 44 of the guide thimble 14, its securement bulges are substantially destroyed such that they cannot again serve their designated purpose. This is because that when the bulges are formed, the material is stretched and expanded which weakens the tube. Then, when the bulges are compressed for removal of the tube, the bulges yield and are deformed, being incapable of recapturing their original expanded dimensional shape. As a consequence, locking tubes having securement bulges formed by plastic deformation as known heretofore were normally not able to be reused.

Improved Reusable Locking Tube

Referring now to FIGS. 2 and 4 through 7, there is also seen the improved features on locking tube 48 which makes it reusable. An elongated hollow metal tubular body 70 of the locking tube 48 has at least a pair of small dimples 72 preformed on the tubular body exterior during manufacture and thus prior to insertion of the locking tube 48 to its locking position. The dimples 72 are so preformed by any suitable method, such as by die forming or being coined, and so configured to have a generally pyramidal shape such that the metal forming the dimples substantially resists yielding and dimensional change regardless of the number of insertions and withdrawals of the tubular body 70 into and from the locking position. In the alternative, the dimples 72 could be formed by adding material to the tube such as by spot welding. Due to the dense concentration of material which forms the dimples 72, they (the dimples) do not yield when the locking tube 48 is removed from its locking position, as was the case with the securement bulges, but rather, the whole locking tube per se yields and then springs back to its original shape.

Also, the dimples 72 are located along the exterior of the tubular body 70 and have outer tips diametrically displaced from one another across the tubular body such that when the body is inserted to the locking position, as seen in FIG. 7, the dimples extend into the circumferential bulge 56 defined in the guide thimble upper end portion 44. In such manner, the dimples 72 provide a positive interference fit with the guide thimble upper end portion 44 above the circumferential bulge 56 therein and with the upper portion 76 of the adapter plate passageway wall (defining the upper bore 62) which prevents inadvertent withdrawal of the tubular body from the locking position.

Specifically, the pair of dimples 72 are preformed along the exterior of the tubular body 70 at the region of connection of the upper flared marginal edge portion 68 of the tubular body to the remaining lower portion thereof. The outer tips 78 of the pair of dimples are diametrically displaced from one another across the tubular body 70 at a distance greater than the inside diameter of the ledge 66 defined between the lower and upper bores 64,62 of the adapter plate passageway 42 such that after removal of the top nozzle 22 from the guide thimbles 14, each locking tube 48 can be reinserted into the adapter plate passageway 42 to a position in which the dimples 72 are disposed below and in an interference fitting relationship with the ledge 66 therein.

As an example, so as to illustrate the almost microscopic size of the preformed dimples, the distance between the outer tips 78 of the dimples 72 would be 0.554 inch, when the outside diameter of the tubular body 70 of the locking tube below the dimples 72 is 0.543 inch. Thus, it is seen that, in this example, each dimple is only about 0.0055 inch in height.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. In a reconstitutable fuel assembly including a top nozzle with an adapter plate having an interior wall forming at least one passageway, at least one guide thimble with an upper end portion, and an attaching structure having an outer socket formed by a circumferential groove defined in said adapter plate passageway wall and opening into said passageway and an inner socket formed by a circumferential bulge and at least one longitudinal slot defined in said upper end portion of said guide thimble, said circumferential bulge capable of seating within said circumferential groove, an improved reusable tube for releasably locking said inner socket of said guide thimble upper end portion in locking engagement within said outer socket of said adapter plate passageway when said circumferential bulge is seated within said circumferential groove, said reusable tube comprising:

(a) an elongated hollow tubular body capable of insertion within said adapter plate passageway and guide thimble upper end portion to a locking position therein such that said circumferential bulge of said inner socket is maintained seated in said locking engagement with said circumferential groove of said outer socket; and (b) at least a pair of dimples preformed on the exterior of said tubular body prior to insertion of said body in said guide thimble upper end portion and to said locking position, said dimples being preformed and configured to increase the thickness of said tubular body in relation to the remainder of said tubular body, said dimples substantially resisting resilient yielding in relation to the remainder of said tubular body which resiliently yields to permit insertion and withdrawal thereof into and from said locking position, said dimples being located along the exterior of said tubular body and having outer tips diametrically displaced from one another across said tubular body such that with said circumferential bulge of said guide thimble upper end portion seated within said circumferential groove of said adapter plate and with said tubular body inserted at said locking position said dimples extend outwardly into said circumferential bulge defined in said guide thimble upper end portion and said tubular body provides a positive interference fit with said guide thimble upper end portion above said circumferential bulge therein and with said upper portion of said adapter plate passageway wall which prevents inadvertent withdrawal of said tubular body from said locking position.

2. The improved reusable locking tube as recited in claim 1, wherein:

said tubular body has a lower portion and an upper portion, said upper body portion being outwardly flared progressively from its connection to said lower body portion to an upper edge of said upper body portion so as to provide a frictional fit with an upper portion of said adapter plate passageway wall when said tubular body is inserted at said locking position; and said pair of dimples being preformed along the exterior of said tubular body at the region of connection of said upper body portion to said lower body portion.

3. The improved reusable locking tube as recited in claim 2, wherein said lower body portion is substantially greater in length than said upper body portion.

4. The improved reusable locking tube as recited in claim 1, wherein each of said dimples has a generally pyramidal-shaped configuration.

5. The improved reusable locking tube as recited in claim 1, wherein:

said adapter plate passageway is composed of an upper bore and a lower bore, said lower bore having a larger diameter than said upper bore such that the intersection of said bores forms a ledge against which an upper edge of said guide thimble upper end portion abuts when said circumferential bulge of said inner socket is seated within said circumferential groove of said outer socket; and said outer tips of said pair of dimples are diametrically displaced from one another across said tubular body at a distance greater than the inside diameter of said ledge defined between said lower and upper bores such that after removal of said top nozzle from said guide thimble said locking tube can be reinserted into said adapter plate passageway to a position in which said dimples are disposed in an interference fitting relationship with said ledge therein.

6. In a reconstitutable fuel assembly including a top nozzle with an adapter plate having an interior wall forming at least one passageway, at least one guide thimble with an upper end portion, and an attaching structure having an outer socket formed by a circumferential groove defined in said adapter plate interior wall and opening into said passageway and an inner socket formed by a circumferential bulge and at least one longitudinal slot defined in said upper end portion of said guide thimble, said circumferential bulge capable of seating within said circumferential groove, an improved reusable tube for releasably locking said inner socket of said guide thimble upper end portion in locking engagement within said outer socket of said adapter plate passageway when said circumferential bulge is seated within said circumferential groove, said reusable tube comprising:

(a) an elongated hollow metal tubular body having a lower portion and an upper portion, said lower body portion having an outside diameter less than the inside diameters of said adapter plate passageway and said upper end portion of said guide thimble when said outer and inner sockets thereof are in said locking engagement which allows insertion of said tubular body within said adapter plate passageway and guide thimble upper end portion to a locking position therein which maintains said circumferential bulge of said inner socket seated in said locking engagement with said circumferential groove of said outer socket, said upper body portion being outwardly flared progressively from its connection to said lower body portion to an upper edge of said upper body portion so as to provide a frictional fit with an upper portion of said adapter plate passageway wall when said tubular body is inserted at said locking position; and (b) at least a pair of dimples preformed on the exterior of said tubular body to insertion of said body in said guide thimble upper end portion and to said locking position, said dimples being preformed and configured to have a generally pyramidal shape and to increase the thickness of said tubular body in relation to the remainder of said tubular body, said dimples substantially resisting yielding resilient in relation to the remainder of said tubular body which resiliently yields to permit insertion and withdrawal thereof into and from said locking position, said dimples being located along the exterior of said tubular body and having outer tips diametrically displaced from one another across said tubular body at a distance greater than the inside diameter of an upper portion of said adapter plate passageway wall such that with said circumferential bulge of said guide thimble upper end portion seated within said circumferential groove of said adapter plate and with said tubular body inserted at said locking position said dimples extend outwardly into said circumferential bulge defined in said guide thimble upper end portion and said tubular body provides a positive interference fit with said guide thimble upper end portion above said circumferential bulge therein and with said upper portion of said adapter plate passageway wall which prevents inadvertent withdrawal of said tubular body from said locking position.

7. The improved reusable locking tube as recited in claim 6, wherein said pair of dimples are preformed along the exterior of said tubular body at the region of connection of said upper body portion to said lower body portion.

8. The improved reusable locking tube as recited in claim 6, wherein:

said adapter plate passageway is composed of an upper bore and a lower bore, said lower bore having a larger diameter than said upper bore such that the intersection of said bores forms a ledge against which an upper edge of said guide thimble upper end portion abuts when said circumferential bulge of said inner socket is seated within said circumferential groove of said outer socket; and said outer tips of said pair of dimples are diametrically displaced from one another across said tubular body at a distance greater than the inside diameter of said ledge defined between said lower and upper bores such that after removal of said top nozzle from said guide thimble said locking tube can be reinserted into said adapter plate passageway to a position in which said dimples are disposed in an interference fitting relationship with said ledge therein.

* * * * *